(12) United States Patent
Swallow et al.

(10) Patent No.: US 7,694,867 B2
(45) Date of Patent: Apr. 13, 2010

(54) SOLID STATE JOINING METHOD FOR CONTINUOUS STRUCTURES

(75) Inventors: Christopher H. Swallow, St. Louis, MO (US); Eric J. Stern, Valmeyer, IL (US)

(73) Assignee: The Boeing Company, Chicago, IL (US)

( * ) Notice: Subject to any disclaimer, the term of this patent is extended or adjusted under 35 U.S.C. 154(b) by 107 days.

(21) Appl. No.: 11/837,372

(22) Filed: Aug. 10, 2007

(65) Prior Publication Data
US 2009/0041539 A1    Feb. 12, 2009

(51) Int. Cl.
*B23K 20/12* (2006.01)
(52) U.S. Cl. .................... 228/112.1; 228/113
(58) Field of Classification Search ............ 228/2.1, 228/112.1, 113, 119
See application file for complete search history.

(56) References Cited

U.S. PATENT DOCUMENTS

| | | | | |
|---|---|---|---|---|
| 5,975,406 | A * | 11/1999 | Mahoney et al. | 228/112.1 |
| 6,742,697 | B2 * | 6/2004 | McTernan et al. | 228/112.1 |
| 6,779,708 | B2 | 8/2004 | Slattery | |
| 6,799,708 | B2 | 10/2004 | von Strombeck et al. | |
| 6,910,616 | B2 | 6/2005 | Halley et al. | |
| 7,083,076 | B2 | 8/2006 | Slattery | |
| 7,225,967 | B2 | 6/2007 | Slattery | |
| 7,398,911 | B2 | 7/2008 | Slattery et al. | |
| 7,431,194 | B2 | 10/2008 | Slattery | |
| 2004/0004108 | A1 | 1/2004 | Halley et al. | |
| 2004/0094604 | A1 | 5/2004 | Halley et al. | |
| 2005/0127139 | A1 | 6/2005 | Slattery et al. | |
| 2006/0213953 | A1 | 9/2006 | Slattery | |

OTHER PUBLICATIONS

Thompson Friction Welding, Linear Friction Welding, http://www.thompson-friction-welding.co.uk, date unknown.*

* cited by examiner

*Primary Examiner*—Jessica L. Ward
*Assistant Examiner*—Kevin E Yoon
(74) *Attorney, Agent, or Firm*—Klintworth & Rozenblat IP LLC

(57) ABSTRACT

Under one step of one embodiment of a solid state method for joining structures, angled edges of at least two structures are disposed adjacent to one another. In another step, a plurality of angled joining members are disposed adjacent to one another between the adjacent angled edges of the at least two structures. In still another step, the angled joining members are welded between the adjacent angled edges of the at least two structures. In yet another step, at least one hole is formed into and extended between adjacent edges of the welded angled joining members. In an additional step, a plug member is forced at least partially into the at least one hole.

16 Claims, 6 Drawing Sheets

US 7,694,867 B2

SOLID STATE JOINING METHOD FOR CONTINUOUS STRUCTURES

BACKGROUND

Often, large structures are produced from even larger pieces of material. For instance, a large piece of material may be machined to remove scrap or waste material in order to produce the desired structure. This may lead to a large amount of scrap or waste material, which may be costly and inefficient.

A solid state method for joining structures, and a solid state joined structure apparatus, is needed to decrease one or more problems associated with one or more of the existing methods and/or apparatus.

SUMMARY

In one aspect of the disclosure, a solid state method for joining structures is provided. In one step, angled edges of at least two structures are disposed adjacent to one another. In another step, a plurality of angled joining members are disposed adjacent to one another between the adjacent angled edges of the at least two structures. In still another step, the angled joining members are welded between the adjacent angled edges of the at least two structures. In yet another step, at least one hole is formed into and extended between adjacent edges of the welded angled joining members. In an additional step, a plug member is forced at least partially into the at least one hole.

In another aspect of the disclosure a solid state joined structure apparatus includes the following: a plurality of structures having angled edges disposed adjacent to one another; a plurality of angled joining members disposed adjacent to one another and welded between the adjacent angled edges of the plurality of structures; at least one hole formed into and extending between adjacent edges of the welded angled joining members; and a plug member at least partially forced into the at least one hole.

These and other features, aspects and advantages of the disclosure will become better understood with reference to the following drawings, description and claims.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
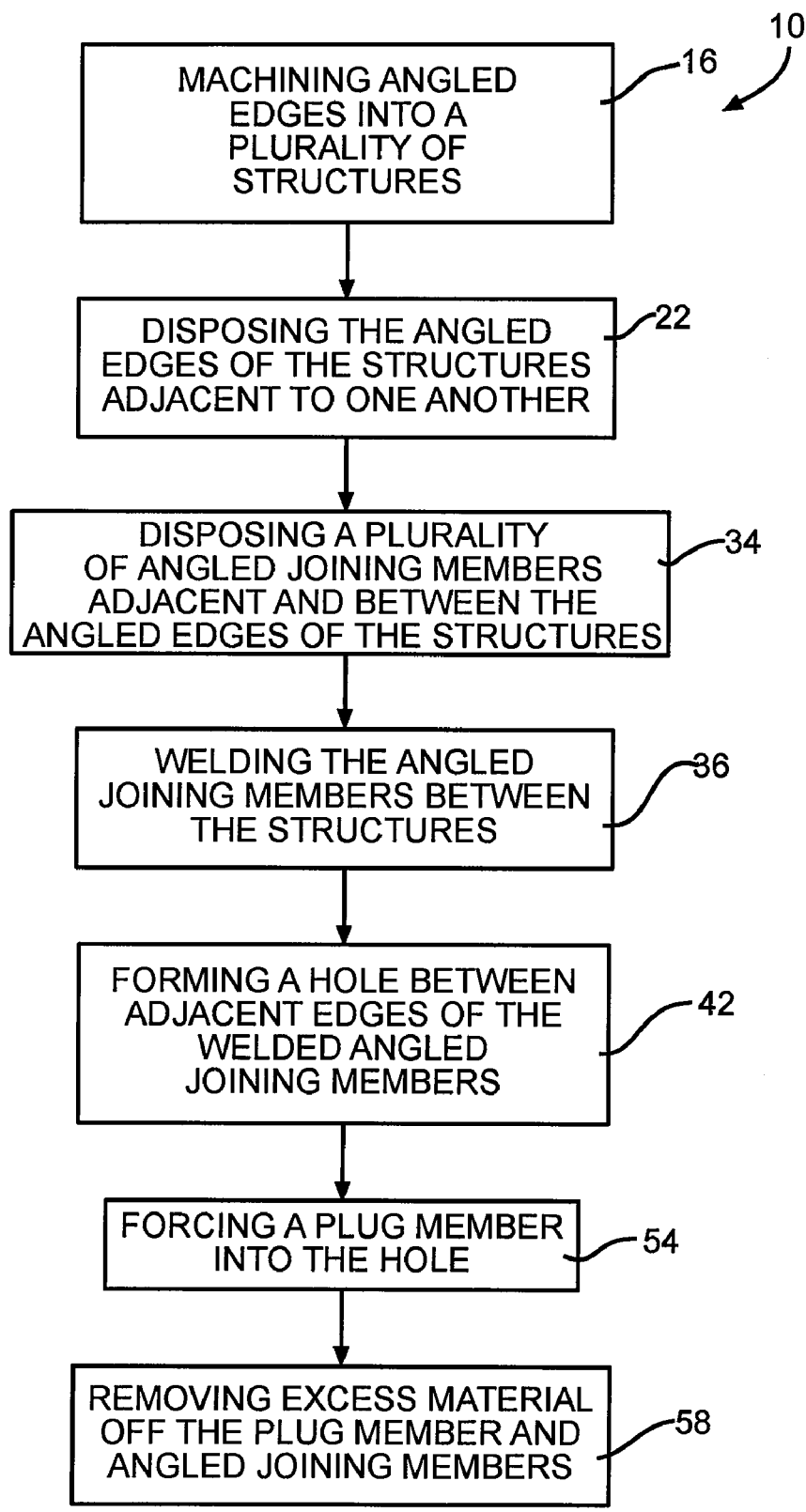
FIG. 1 shows a flowchart of one embodiment of a solid state method for joining structures.
Figure 2:
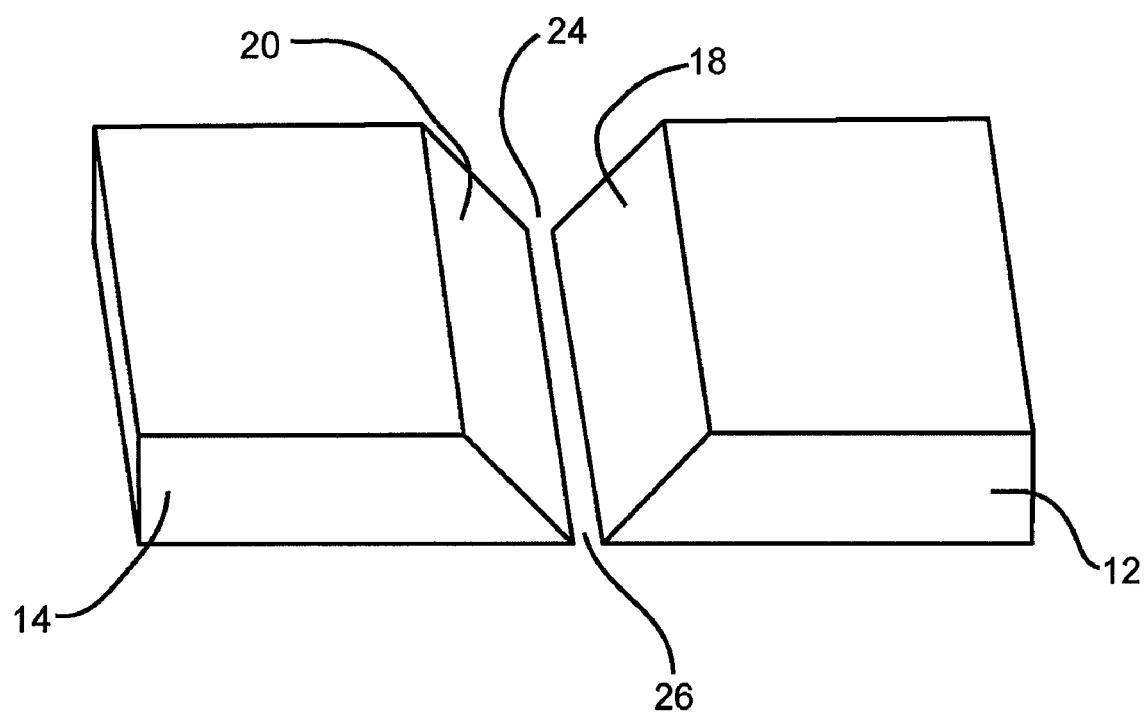
FIG. 2 shows a top perspective view of a plurality of structures to be joined using the solid state method of FIG. 1.

FIG. 1 shows a flowchart of one embodiment 10 of a solid state method for joining structures. FIG. 2 shows a top perspective view of a plurality of structures 12 and 14 to be joined under the solid state method 10 of FIG. 1. The structures 12 and 14 may comprise parts of an aircraft. In other embodiments, the structures 12 and 14 to be joined may comprise non-aircraft parts. In other embodiments, any number of structures may be joined under the method 10. For instance, more than two structures may be joined under the method 10. In one step 16, angled edges 18 and 20 may be milled into each of the structures 12 and 14. In other embodiments, varied number, shape, orientation, and configuration surfaces may be machined, utilizing any known process, into any number of structures to be joined. In another step 22, as shown in FIGS. 1 and 2, the angled edges 18 and 20 of the structures 12 and 14 may be disposed adjacent to one another. A cavity 24 and first gap 26 may be formed between the adjacent angled edges 18 and 20 of the structures 12 and 14. In other embodiments, the structures 12 and 14 may be disposed in varying orientations and configurations, forming varying shaped cavities and/or gaps.

Figure 3:
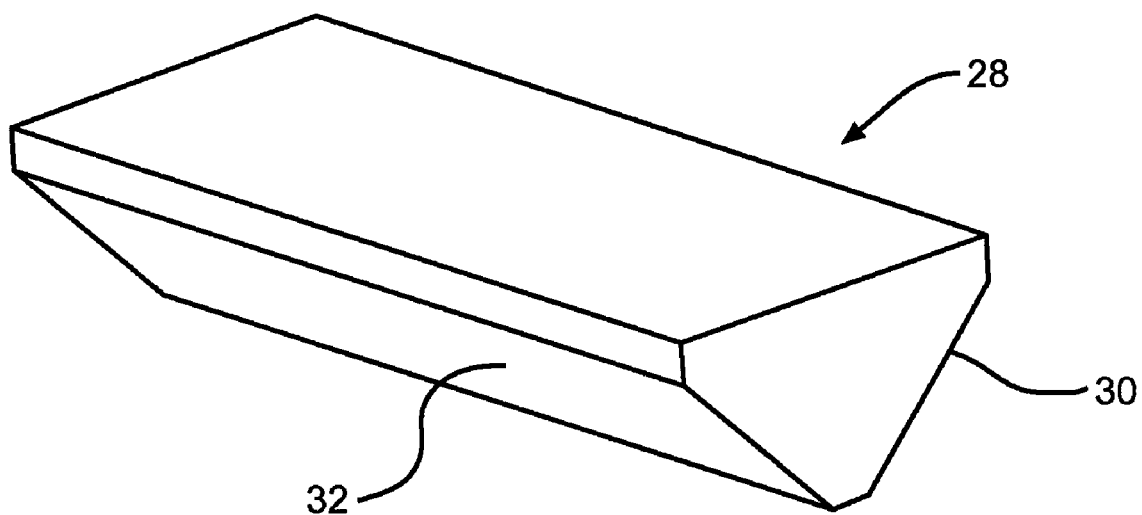
FIG. 3 shows a top perspective view of an angled joining member having angled surfaces which may be used to join the structures of FIG. 2 using the method of FIG. 1.
Figure 4:
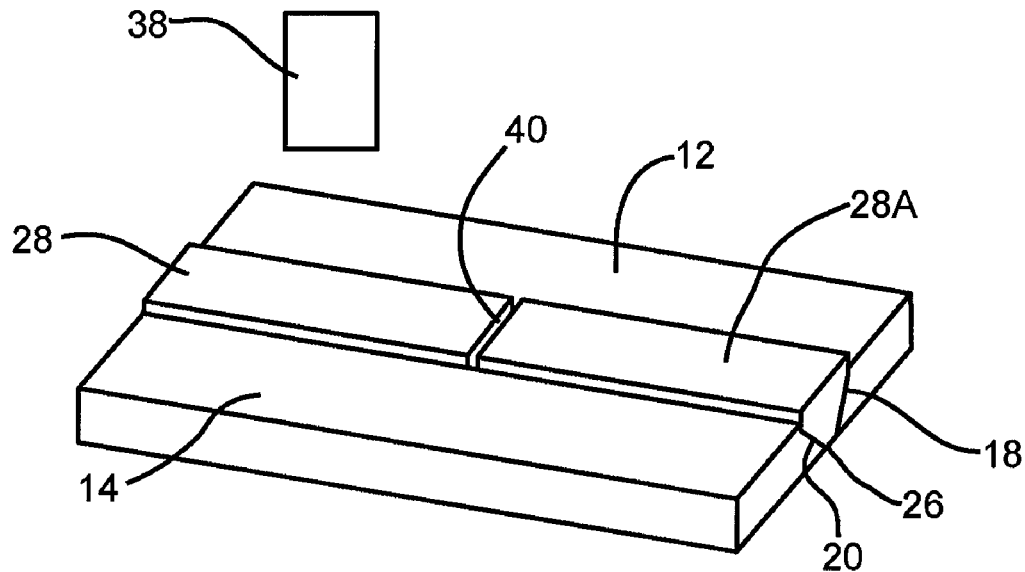
FIG. 4 shows a top perspective view of two of the angled joining members of FIG. 3 being disposed and welded adjacent to one another between adjacent angled edges of the structures being joined in FIG. 2 using the method of FIG. 1.

FIG. 3 shows a top perspective view of an angled joining member 28 having angled surfaces 30 and 32. The angled joining member 28 may comprise a keystone member. In step 34, as shown in FIGS. 1 and 4, two identical angled joining members 28 and 28A may be disposed adjacent to one another between the adjacent angled edges 18 and 20 of the structures 12 and 14. The plurality of angled joining members 28 and 28A may be disposed into the first gap 26 disposed between the plurality of structures 12 and 14. The angled joining members 28 and 28A may be disposed and aligned linearly between the adjacent angled edges 18 and 20 of the structures 12 and 14. In other embodiments, any number of angled joining members 28 and 28A may be disposed in varying configurations and orientations between the adjacent angled edges 18 and 20 of the structures 12 and 14. For instance, in one embodiment, more than two angled joining members 28 and 28A may be disposed between adjacent angled edges 18 and 20 of two or more structures 12 and 14.

In step 36, as shown in FIGS. 1 and 4, the angled joining members 28 and 28A may be welded in place between the adjacent angled edges 18 and 20 of the structures 12 and 14 utilizing a welding member 38. The plurality of angled joining members 28 and 28A may be welded into the first gap 26 disposed between the plurality of structures 12 and 14. The welding member 38 may comprise a linear friction welding member. In other embodiments, various types of welding devices may be utilized, and any number of angled joining members 28 and 28A may be welded in place between the structures 12 and 14. For instance, in one embodiment, more than two angled joining members may be welded in place to two or more structures. A second gap 40 may be formed between the welded angled joining members 28 and 28A as a result of the linear friction welding. In other embodiments, a second gap 40 may be formed between every two welded together angled joining members 28 and 28A.

Figure 5:
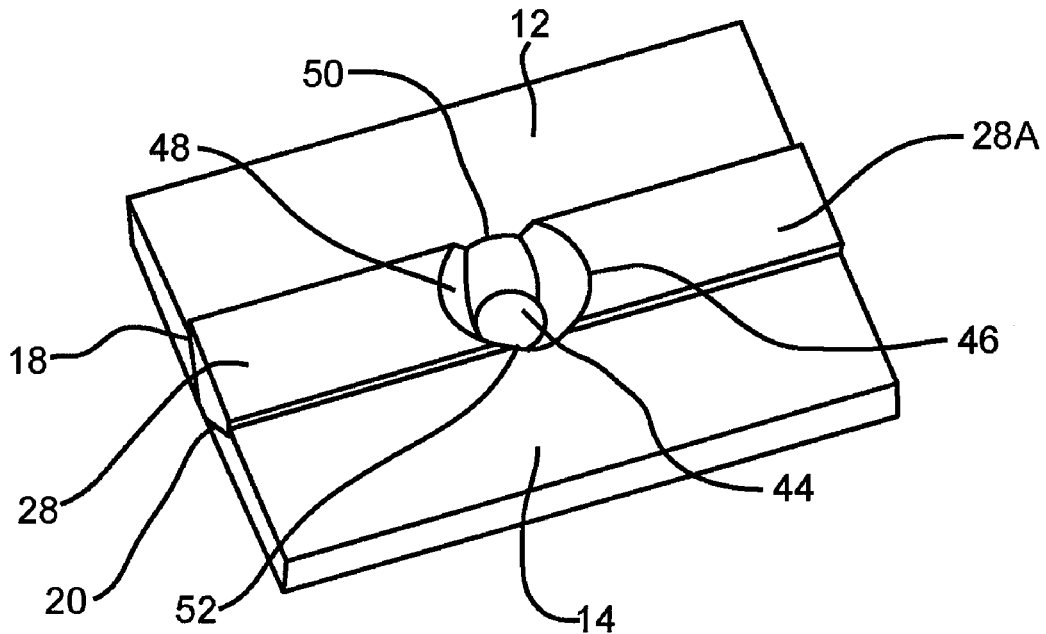
FIG. 5 shows a top perspective view of a hole being formed into and extended between adjacent edges of the welded angled joining members of FIG. 4 using the method of FIG. 1.

In step 42, as shown in FIGS. 1 and 5, a hole 44 may be formed into and extended between adjacent edges 46 and 48 of the welded angled joining members 28 and 28A. The hole 44 may also be formed into and extend between portions 50 and 52 of the angled edges 18 and 20 of the structures 12 and 14. The hole 44 may be cone-shaped, and may be milled. In other embodiments, the hole 44 may be a variety of shape, and may be machined using other processes. In still other embodiments, there may be a plurality of holes 44. For instance, in one embodiment, one hole 44 may be formed between adjacent edges 46 and 48 of every two welded angled joining members 28 and 28A.

Figure 6:
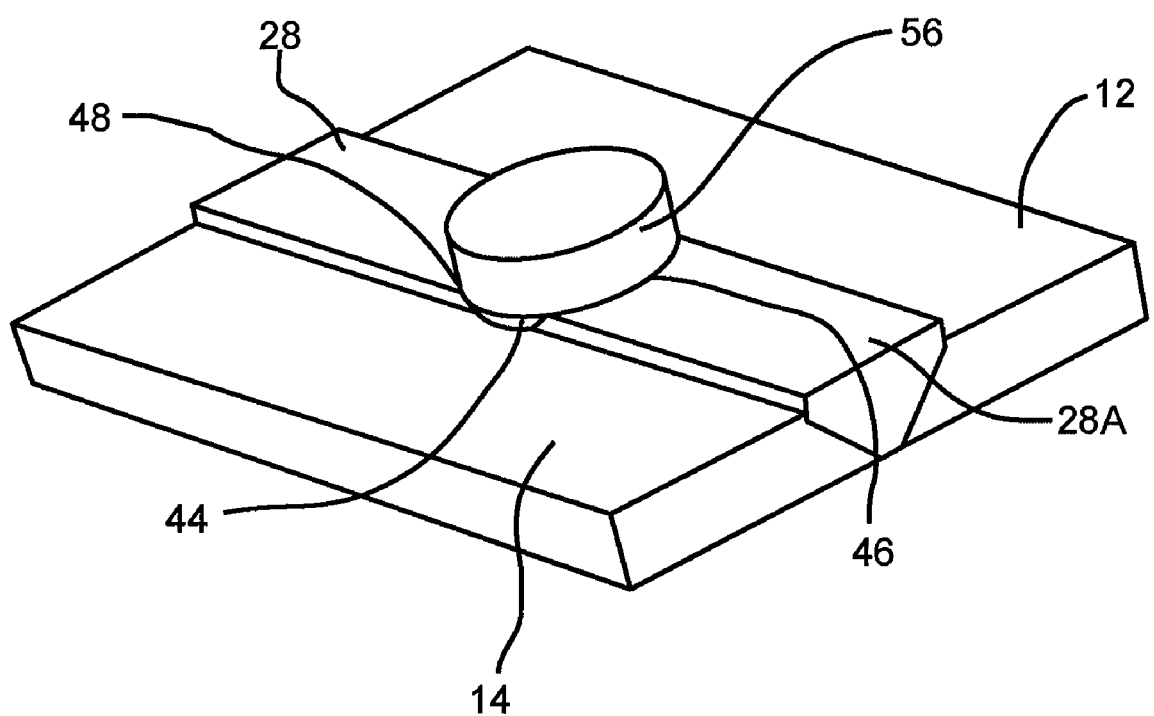
FIG. 6 shows a top perspective view of a plug member being forced at least partially into the hole of FIG. 5 using the method of FIG. 1.

In step 54, as shown in FIGS. 1 and 6, a plug member 56 may be forced at least partially into the hole 44. The plug member 56 may be cone-shaped. In other embodiments, the plug member 56 may have varying shapes. The plug member 56 may be forced at least partially into the hole 44 utilizing rotary friction welding. In other embodiments, varying forcing mechanisms may be used. In still other embodiments, a separate plug member 56 may be forced at least partially into each of a plurality of holes 44 disposed between adjacent edges 46 and 48 of a plurality of welded angled joining members 28 and 28A.

Figure 7:
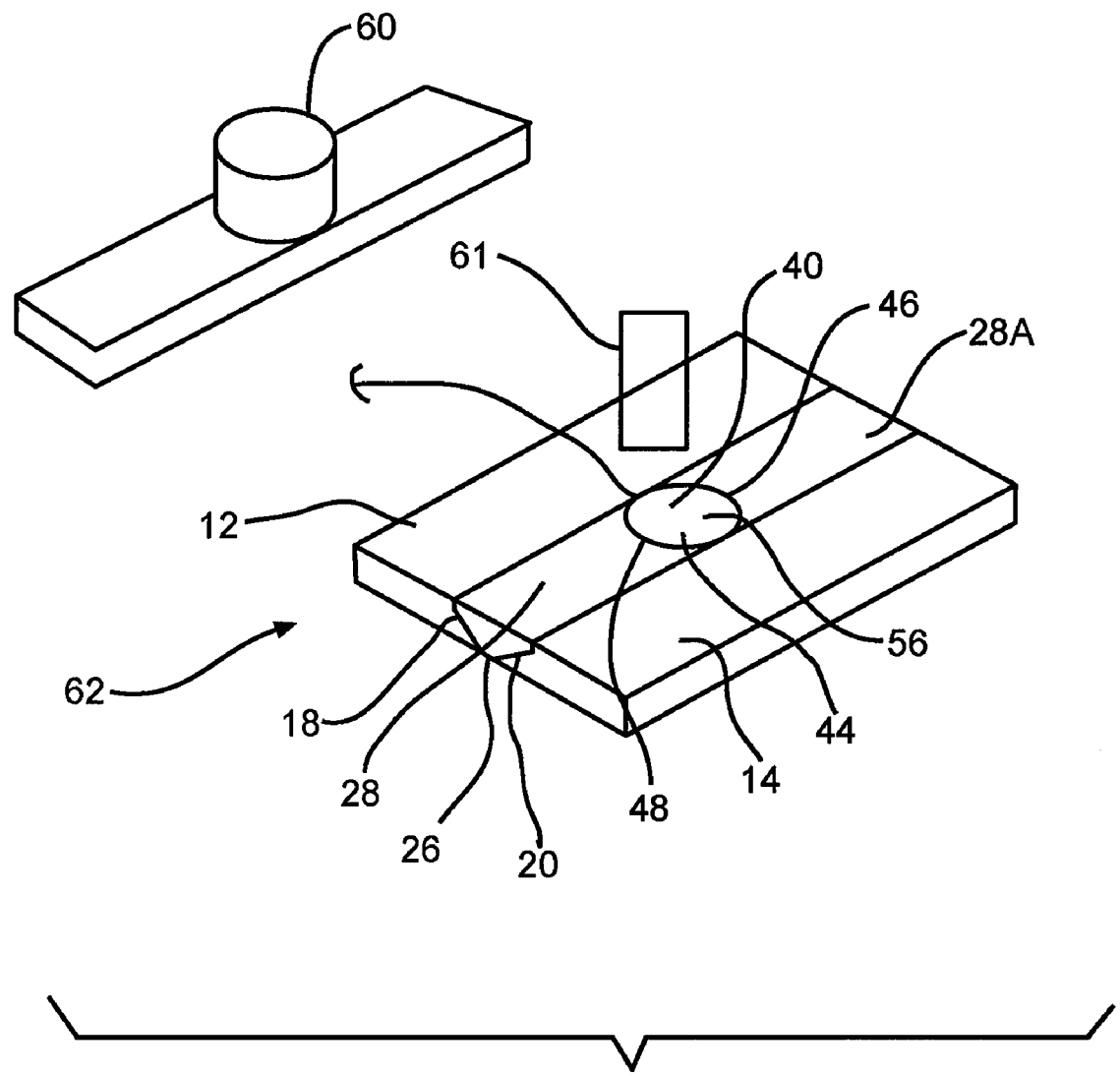
FIG. 7 shows a top perspective view of excess material having been removed off the plug member and the angled joining members of FIG. 6 to form a solid state joined structure apparatus using the method of FIG. 1.

In step 58, as shown in FIGS. 1 and 7, excess material 60 may be removed off the plug member 56 and the angled joining members 28 and 28A using a removal device 61 to form a solid state joined structure apparatus 62. In one embodiment, the excess material 60 may be milled off. In still other embodiments, the excess material may be machined off using varying mechanisms.

By using two or more joining members 28 and 28A and one or more plug members 56, two or more structures 12 and 14 may be joined in order to produce a solid state joined structure apparatus 62 comprising a large continuous structure while limiting the amount of scrap or excess material 60. In such manner, a continuous structure of any size, orientation, configuration, and shape may be produced by using a pre-determined combination of joining members 28, plug members 56, and structures 12 and 14 in the appropriate numbers, sizes, shapes, orientations, and configurations.

In another embodiment, as shown in FIG. 7, a solid state joined structure apparatus 62 may include the following: a plurality of structures 12 and 14 having angled edges 18 and 20 disposed adjacent to one another; a plurality of angled joining members 28 and 28A disposed adjacent to one another and welded between the adjacent angled edges 18 and 20 of the plurality of structures 12 and 14; at least one hole 44 formed into and extending between adjacent edges 46 and 48 of the welded angled joining members 28 and 28A; and a plug member 56 at least partially forced into the at least one hole 44. The plurality of structures 12 and 14 may comprise parts of an aircraft. The angled edges 18 and 20 may have been milled into the plurality of structures 12 and 14.

The plurality of angled joining members 28 and 28A may comprise keystone members which are disposed and welded linearly, using linear friction welding, between the adjacent angled edges 18 and 20 of the plurality of structures 12 and 14. The plurality of angled joining members 28 and 28A may be disposed and welded into a first gap 26 disposed between the plurality of structures 12 and 14. The at least one hole 44 may be a cone-shaped hole formed by a milling process. The at least one hole 44 may have been formed into at least one second gap 40 disposed between the welded angled joining members 28 and 28A. The plug member 56 may be cone-shaped, and may have been at least partially forced into the at least one hole 44 utilizing rotary friction welding.

Excess material 60 may have been removed off the plug member 56 and the angled joining members 28 and 28A. The excess material 60 may have been milled off the plug member 56 and the angled joining members 28 and 28A. In other embodiments, more than two angled joining members 28 and 28A may be disposed and welded between adjacent angled edges 18 and 20 of a plurality of structures 12 and 14, more than one hole 44 may be formed into and extended between adjacent edges 46 and 48 of the welded angled joining members 28 and 28A, and a separate plug member 56 may be at least partially forced into each of the holes 44.

It should be understood, of course, that the foregoing relates to exemplary embodiments of the disclosure and that modifications may be made without departing from the spirit and scope of the disclosure as set forth in the following claims.

The invention claimed is:

1. A solid state method for joining structures comprising:
    disposing angled edges of at least two structures adjacent to one another to form a first gap between the at least two structures;
    disposing a plurality of angled joining members adjacent to one another in the first gap between said adjacent angled edges of said at least two structures, and forming a second gap between the plurality of angled joining members;
    linear friction welding the angled joining members between said adjacent angled edges of said at least two structures;
    forming at least one hole, at a location of the second gap, extending into and between adjacent edges of the welded angled joining members and extending into and between the adjacent angled edges of said at least two structures; and
    forcing a plug member at least partially into said at least one hole using rotary friction welding.

2. The method of claim 1 further comprising the step of removing excess material off the plug member and the angled joining members.

3. The method of claim 2 wherein the step of removing excess material further comprises milling the excess material off the plug member and the angled joining members.

4. The method of claim 1 further comprising the step of milling the angled edges into each of said at least two structures.

5. The method of claim 1 wherein said at least two structures comprise parts of an aircraft.

6. The method of claim 1 wherein the disposing the plurality of angled joining members step further comprises aligning the plurality of angled joining members linearly between said adjacent angled edges of said at least two structures.

7. The method of claim 1 wherein the angled joining members are keystone members.

8. The method of claim 1 wherein the linear friction welding step results in the second gap being disposed between the welded angled joining members.

9. The method of claim 1 wherein the at least one hole is cone-shaped and the forming the hole step comprises milling the at least one cone-shaped hole into and extending between the adjacent edges of the welded angled joining members.

10. The method of claim 1 wherein the plug member is cone-shaped and the forcing step comprises forcing the cone-shaped plug member at least partially into said at least one hole.

11. The method of claim 1 wherein more than two angled joining members are disposed and welded between said adjacent angled edges of said at least two structures, more than one hole is formed into and extending between the adjacent edges of the welded angled joining members, and a separate plug member is at least partially forced into each of said holes.

12. The method of claim 1 wherein the forcing comprises forcing the plug member at least partially into said at least one hole so that the plug member is disposed against each of the adjacent welded angled joining members and against each of the adjacent angled edges of the at least two structures.

13. The method of claim 12 wherein the forcing comprises rotary friction welding the plug member to each of the adjacent welded angled joining members and to each of the adjacent angled edges of the at least two structures.

14. The method of claim 13 wherein the linear friction welding results in the second gap being disposed between the welded angled joining members.

15. The method of claim 1 wherein the at least two structures comprise varying sizes or shapes.

16. The method of claim 1 wherein sizes or shapes of the angled joining members are varied.

* * * * *